Figure 6:
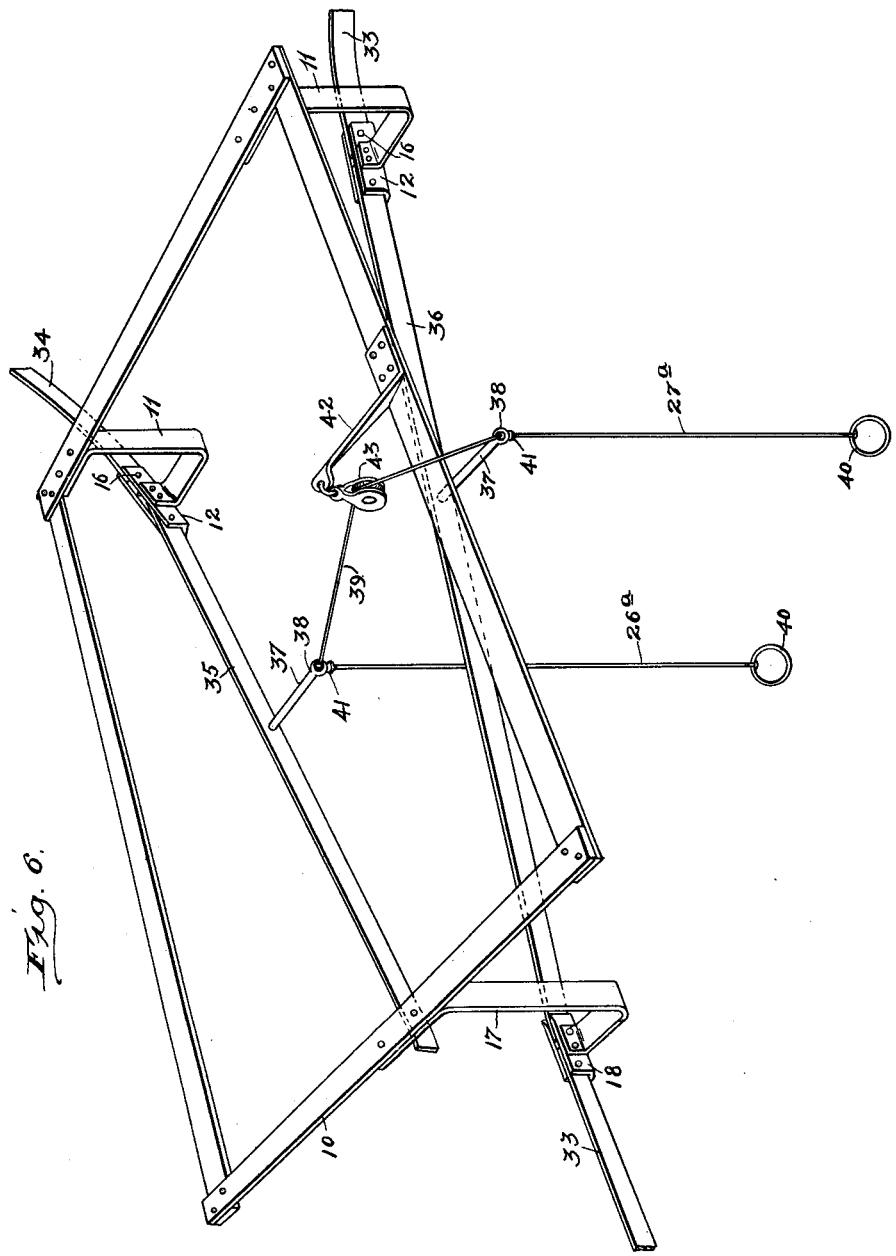

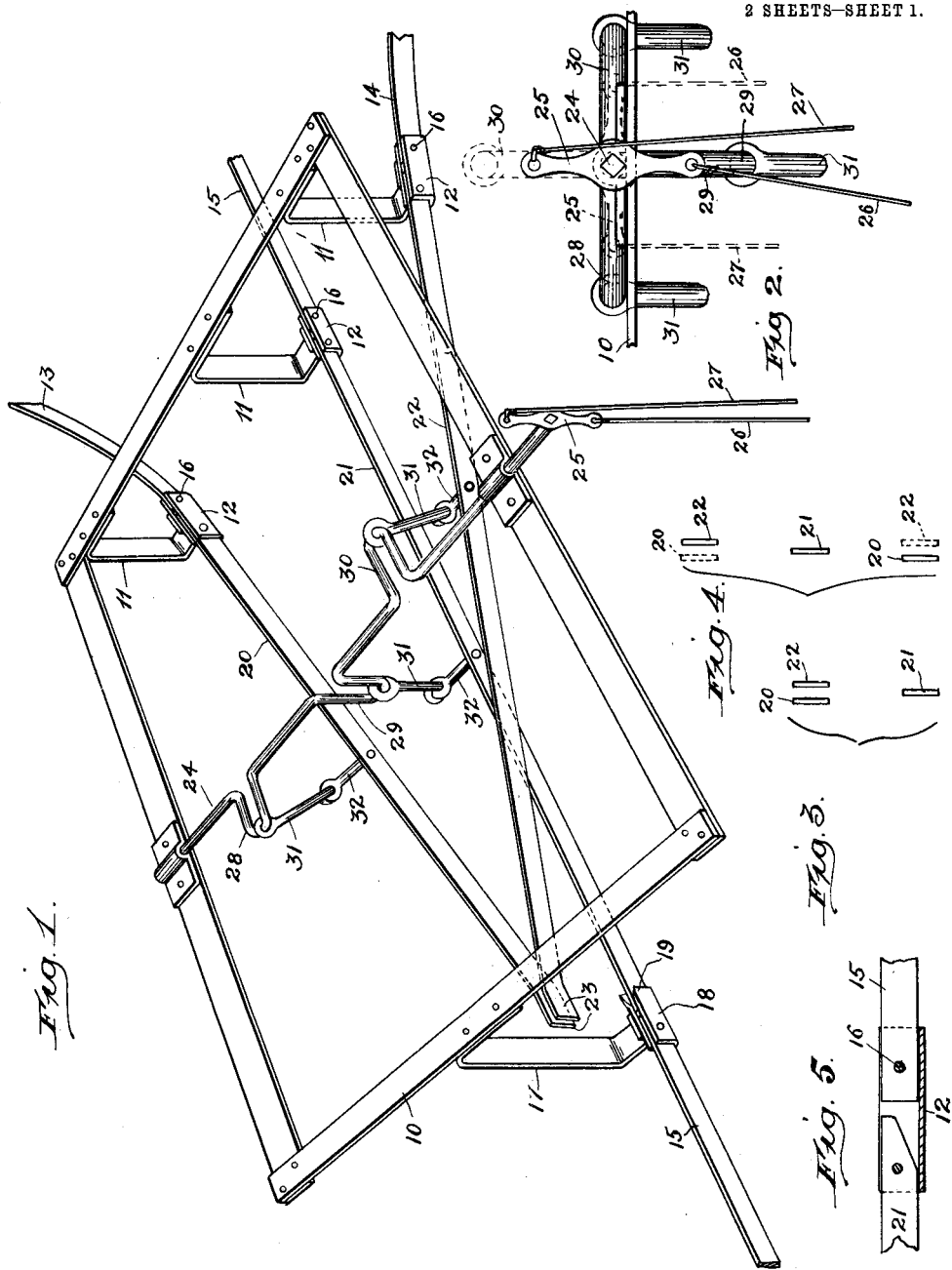

C. K. MURRAY.
OVERHEAD SWITCH.
APPLICATION FILED FEB. 23, 1912.

1,078,945.

Patented Nov. 18, 1913.
2 SHEETS—SHEET 2.

Witnesses:
Chas. E. Gorton.
E. Newstrom

Inventor:
Christopher K. Murray.
By Chas. C. Tillman
Atty.

UNITED STATES PATENT OFFICE.

CHRISTOPHER K. MURRAY, OF OSHKOSH, WISCONSIN.

OVERHEAD SWITCH.

1,078,945. Specification of Letters Patent. Patented Nov. 18, 1913.

Application filed February 23, 1912. Serial No. 679,357.

*To all whom it may concern:*

Be it known that I, CHRISTOPHER K. MURRAY, a citizen of the United States, residing at Oshkosh, in the county of Winnebago and State of Wisconsin, have invented certain new and useful Improvements in Overhead Switches, of which the following is a specification.

This invention relates to improvements in switches for overhead tracks, such as are used for the travel thereon of wheeled carriers employed for transferring manure, litter, grain, silage, ore, coal, and the like, from one point to another, and it consists in certain peculiarities of the construction, novel arrangement, and operation of the various parts thereof, as will be hereinafter more fully set forth and specifically claimed.

The principal object of the invention, is to provide a switch for transferring the carrier from the main track to the branch tracks of an elevated track structure, or vice versa, which shall be strong, durable, and efficient in operation, and so made, that it will be self or automatically closing, thus rendering it impossible for the car or carrier traveling on the track to run through an open switch.

Another object of the invention is to provide an overhead switch which may be used either as a two way or three way switch.

Various other objects and advantages of the invention will be disclosed in the subjoined description and explanation.

In order to enable others skilled in the art to which the invention pertains, to make and use the same, I will now proceed to describe it referring to the accompanying drawings in which—

Figure 1, is a perspective view of an overhead switch embodying one form of the invention, showing it applied to a three way track and illustrating the switch member which unites the sections of the main track rail in operative position and the switch members for the branch tracks in their raised positions. Fig. 2, is a side view of a portion of the switch frame showing the crank shaft mounted thereon and illustrating it by continuous lines with its parts in the position shown in Fig. 1, and by dotted lines the position the parts will assume when the switch member uniting the sections of the main track rail shall have been raised and one of the switch members for one of the side track rails lowered into operative position. Fig. 3, is a diagrammatic view of the free ends of the switch members showing them in the positions illustrated in Fig. 1. Fig. 4, is a similar view of like parts showing the positions the switch members will occupy when one of said members for the branch tracks is in its operative position. Fig. 5, is a side view partly in section of a portion of one of the track rails and a part of one of the switch members showing them connected together by means of a clip, and Fig. 6, is a perspective view of a modified form of the switch showing it applied to a two way track.

Like numerals of reference refer to corresponding parts throughout the different views of the drawings.

The reference numeral 10, designates the supporting or main frame which may be made of any suitable size, form and material, and which may be secured in any suitable manner, to an overhead or elevated support, not shown. In the present instance, the main or supporting frame 10, is shown as being constructed in the form of an open frame, and rectangular in shape, but it is obvious that any suitable construction for the frame may be employed. Secured to the lower surface of the frame 10, at one end thereof are a number of depending hangers 11, each of which has horizontally mounted on its lower portion a channeled or U-shaped clip or member 12, to receive the ends of the branch tracks 13, and 14, and one end of one of the sections 15, of the main track, which tracks may be supported in any suitable or well known manner. The ends of these tracks or sections which extend into the clips or channeled members 12, are preferably secured therein by means of rivets or bolts 16, passed transversely therethrough, and so that the upper surfaces of the track sections will be about flush with the upper surfaces of the clips or members 12, so as to present a smooth track on which the wheels of the carrier may travel.

At the opposite end of the frame 10, from that on which the hangers 11, are mounted, said frame has mounted thereon about midway between its sides a depending hanger, 17, which has horizontally mounted on its lower portion a U-shaped clip or channeled member 18, in the outer portion of which is located and secured another section 15, of the main track. The inner end of the channel in the clip or member 18, is preferably flared as at 19, to more readily receive the free ends of the switch members, as will be presently explained. Pivotally secured at one of its ends to the inner end of the clip 12, which supports the branch track 13, and within the channel of said clip is a branch track switch member 20, which is of sufficient length to extend from the clip 12, to and within the inner portion of the clip 18, which is located at the opposite end of the supporting frame from that on which clip 12, is mounted. Pivotally secured at one of its ends to the inner end of the clip 12, which supports one of the sections of the main track 15, is a main track switch member 21, which is of sufficient length to reach and extend into the channel of the clip 18. Pivotally secured at one of its ends to the inner end of the clip 12, which supports the section 14, of the other branch track is a branch track switch member 22, which is also of sufficient length to reach and extend into the channel of the clip 18. As shown in Fig. 1, of the drawings, the free ends of the switch members 20, and 22, are preferably deflected as at 23, from the main portion of said members so as to aline with the channel of the clip 18, when said switch members are lowered into their operative positions, and so that they will more readily fit within the inner portion of the channel of the clip 18, whether said portion of said channel is flared or not.

Transversely journaled on the frame 10, about midway thereof, is a crank shaft 24, which is provided at one of its ends with a handle 25, to the ends of which are secured cords or chains 26, and 27, which may depend downwardly a suitable distance to be within easy reach of the operator. This shaft 24, is provided with three cranks 28, 29, and 30, each of which is preferably formed by looping the crank shaft 24, as shown in Fig. 1, of the drawings. Loosely mounted at one of its ends on each of said cranks is a link 31, the lower portion of each of which is loosely connected to one end of a laterally and horizontally extended arm 32, one of which is mounted on each of the switch members 20, 21, and 22, between their ends.

In Fig. 6, of the drawings, is shown a modification in the construction of the switch, which in the construction just above described, includes a frame 10, of any suitable size, form and construction, on or near one end of which are mounted depending hangers 11, each of which has mounted on its lower portion horizontally disposed channeled clips or members 12, which support at their outer ends track sections 33, and 34, one of which may be a portion of the main track, and the other of which may be a portion of a branch track. At the opposite end of the frame 10, from that on which the hangers 11, are secured a depending hanger 17, is mounted about midway between the sides of said frame. This hanger has horizontally mounted on its lower portion a channeled or U-shaped clip 18, as in the other construction, and supports one end of a track section 33, which may be a part of the main track. Pivotally secured at one of its ends to the inner portion of the clip or member 12, on the hanger 11, which supports the track section 34, at one of its ends, is a switch member 35, which is of sufficient length to reach to and within the inner portion of the channel of the clip 18. Pivotally secured at one of its ends to the inner portion of the clip 12, which is mounted on the hanger 11, which supports the track section 33, is a switch member 36, which is of sufficient length to reach to and within the inner portion of the channel of the clip 18. Each of the switch members 35, and 36, is provided between its ends with a laterally extended arm 37, each of which is provided at its free end with an eye or opening 38, through which is extended a cord, cable or chain 39, which may have on its ends rings or handles 40, for the convenience of pulling down the desired end of said cord or connections. This cord or connection is provided at points just below the eyes or openings 38, in the arms 37, with enlargements 41, which will prevent the cord or connection passing upwardly through said openings. Mounted on the upper portion of the frame 10, and at one of the sides thereof is a bracket 42, which has connected to its upper or free end a grooved pulley 43, over which the flexible connection 39, passes as is clearly shown in Fig. 6, of the drawings.

The modified construction shown in Fig. 6, and just above described, is especially adapted for a two way track, and as is apparent, is of an extremely simple and inexpensive yet very efficient construction.

While the construction shown in Fig. 1, and above described, is more particularly intended for a three way track as shown, yet it is apparent that by dispensing with one of the cranks, and one of the switch members, and the connections for said crank and switch member, said construction can also be used on a two way track.

From the foregoing and by reference to the drawings, it will be readily understood and clearly seen, that, assuming the parts are in the positions shown in Fig. 1, of the drawings, it is obvious that the main track composed of the sections 15, 21, and 15, will be open for the travel of the carrier or car, and that if it is desired to switch the car on to the branch track 13, this can be done by pulling on the cord 27, so that the handle 25, and said cord 27, will assume the positions shown by dotted lines in Fig. 2, of the drawings, in which operation it is apparent that the crank 30, will be moved from position indicated by continuous lines in Fig. 2, to that shown by dotted lines in said figure, and that the switch members 20, 21, and 22, will be transferred from the positions shown in Fig. 3, to those shown by continuous lines in Fig. 4, of the drawings, thus placing the branch track 13, in operative connection with the main track 15, at one end of the switch frame. If it is desired to switch the carrier from the main track 15, to the branch track 14, the handle 25, and crank shaft 24, can be turned by means of the cords 26, and 27, in the opposite direction, so as to cause the switch members to be transferred from the positions indicated in Fig. 3, to those shown by dotted lines in Fig. 4, of the drawings.

In using the construction shown in Fig. 6, in order to switch the carrier from the track 33, to the track 34, it is apparent that by pulling down on the cord 26ª, the switch member 36, will be raised and the switch member 35, lowered into operative position, or if it is desired to have the carrier transferred on the track 33, the member 36 may be placed in operative position by pulling down on the cord 27ª, which will cause the switch member 35, to be raised out of the way. It will be understood that in using either of the constructions, it will be impossible for a carrier to run through an open switch, for one of the switch members will always be in operative position, and if the carrier should be on one of the sections of the track, on which the switch member is raised, it is apparent that the weight of the carrier will depress said switch member into operative position and at the same time raise the other members out of the way, in other words, a perfectly safe and automatically or self closing switch is provided. It will be observed in each of the constructions, that the main track section as well as each of the branch track sections is provided with a switch member which members are adapted for upward and downward movements, instead of lateral movements, and that the said members when lowered, one at a time will unite one of the sections of the main track with one of the branch tracks or the other section of the main track.

My invention is hereinabove set forth as embodied in two particular forms of construction, but I do not limit it thereto or to less than all the possible forms in which the invention as hereinafter claimed may be embodied and distinguished from any prior devices for like purposes.

Having thus fully described my invention what I claim as new and desire to secure by Letters-Patent is—

1. A switch consisting of a frame, a plurality of hangers supported by and near one end of the frame, a hanger supported by and near the other end of the frame, track rails supported with one of their ends at the lower portion of each of said hangers, a switch member loosely mounted near the lower end of each of the first named hangers and extended at their other ends to near the last named hanger, and means to raise and lower each of said switch members one at a time and to bring and maintain their free ends when lowered in line with the rail which has one of its ends located at the lower portion of the last named hanger.

2. A switch consisting of a frame, a plurality of hangers supported by and near one end of the frame, a hanger supported by and near the other end of the frame, track rails supported at one of their ends on the lower portion of each of said first named hangers, a main track rail supported at one of its ends on the lower portion of the last named hanger, a switch member loosely mounted on the lower portion of each of the first named hangers and extended at their other ends to near the last named hanger, and means to raise and lower each of said switch members one at a time and to bring and maintain their free ends when lowered in line with the main track.

3. A switch consisting of a frame, a plurality of hangers supported by and near one end of the frame and each having on its lower portion a horizontally disposed channeled part, a hanger supported by and near the other end of the frame and having on its lower portion a horizontally disposed channeled part, track rails supported at one of their ends in the channeled parts of each of said first named hangers, a main track rail supported at one of its ends in the channeled part of the last named hanger, a switch member loosely mounted in each of the channeled parts of the first named hangers and extended at their other ends to near the last named hanger and adapted to fit in the channeled part of said hanger, and means to raise and lower the free end of each of said switch members and to cause them to fit in the channeled part of the hanger which supports the main track rail.

4. An overhead switch consisting of a frame, at least three depending hangers supported by and near one end of said frame, a single depending hanger supported by and near the other end of the frame, track rails supported at one of their ends on the lower portion of each of said first named hangers, a section of the main track rail supported at one of its ends on the lower portion of the last named hanger, a switch member loosely mounted on the lower portion of each of the first named hangers and extended at their free ends to near the last named hanger, a shaft transversely journaled on the frame and having at least three cranks extended therefrom at angles to one another, a connection uniting each of said cranks to one of said switch members, and means to rock the shaft.

CHRISTOPHER K. MURRAY.

Witnesses:
 WILLIAM N. POWERS,
 WILLIAM F. MCNAMARA.

Copies of this patent may be obtained for five cents each, by addressing the "Commissioner of Patents, Washington, D. C."